United States Patent [19]

Johnson et al.

[11] Patent Number: 4,573,398

[45] Date of Patent: Mar. 4, 1986

[54] PRESSURE CONTROL DEVICE AND METHOD OF MAKING THE SAME

[75] Inventors: Carl N. Johnson; Hemant Phadke, both of Worthington; Roger L. Sieling, Columbus, all of Ohio

[73] Assignee: Ranco Incorporated, Dublin, Ohio

[21] Appl. No.: 668,001

[22] Filed: Nov. 5, 1984

[51] Int. Cl.$^4$ .......................... F16J 3/02; F01B 19/00

[52] U.S. Cl. .................................. 92/101; 92/103 M; 200/83 P

[58] Field of Search .................. 251/75, 61.2; 91/346, 91/344; 92/103 M, 101; 200/83 P

[56] References Cited

U.S. PATENT DOCUMENTS

| | | | |
|---|---|---|---|
| 2,521,891 | 9/1950 | Beams | 251/75 |
| 2,608,352 | 8/1952 | Schuster et al. | 251/75 |
| 2,984,225 | 5/1961 | Young | 91/346 |
| 3,330,925 | 7/1967 | Andrew et al. | 200/83 P |
| 3,335,242 | 8/1967 | Johnson | 200/83 P |
| 3,378,656 | 4/1968 | Johnson | 200/83 P |
| 3,585,328 | 6/1971 | Fiore | 92/103 M |
| 3,588,395 | 6/1971 | Hersey | 92/101 |
| 3,720,090 | 3/1973 | Halpert et al. | 73/4 R |
| 3,864,537 | 2/1975 | Fiore | 200/83 S |
| 4,220,836 | 9/1980 | Hersey | 92/103 M |

FOREIGN PATENT DOCUMENTS

| | | | |
|---|---|---|---|
| 2329068 | 1/1975 | Fed. Rep. of Germany | 251/75 |

*Primary Examiner*—Paul E. Maslousky

*Attorney, Agent, or Firm*—Watts, Hoffmann, Fisher & Heinke

[57] ABSTRACT

A pressure responsive control device having a pressure housing assembly defining a pressure chamber, an actuable control fixed to the housing assembly and, a pressure transducer module hermetically closing the pressure chamber. The module includes a snap acting pressure responsive diaphragm, a diaphragm control plate hermetically bonded to the diaphragm outer periphery, and a support member hermetically joined to and supporting the control plate and hermetically joined to the housing assembly. The control plate has a supporting region rigidly supporting the diaphragm and the diaphragm control regions are yielded and deformed relative to the supporting region to position the control regions for stressing the diaphragm to determine the chamber pressure levels at which the diaphragm moves.

12 Claims, 2 Drawing Figures

PRESSURE CONTROL DEVICE AND METHOD OF MAKING THE SAME

DESCRIPTION

1. Technical Field

The present invention relates to pressure responsive control devices and more particularly to pressure responsive control devices employing snap acting diaphragms calibrated to respond to predetermined sensed pressures.

2. Background Art

Fluid pressure responsive control devices employing snap acting diaphragms for actuating a switch, or the like, are widely used for various pressure controlling functions. For example, these kinds of controls are used in refrigeration systems for governing the operation of a refrigerant compressor in response to sensed system refrigerant pressures. Devices of this sort must be small, inexpensive, accurate and highly reliable in order to find a market.

These kinds of pressure controls are often used to cycle a controlled device and thus respond to the existence of a predetermined high pressure level as well as to the existence of a predetermined lower pressure level. When controlling an air conditioner in accordance with sensed refrigerant condenser pressures, for example, the control device senses the existence of a predetermined high refrigerant pressure in the condenser and reacts to terminate operation of the refrigerant compressor. When the sensed condenser refrigerant pressure reaches a given lower level the control device reacts again to enable operation of the compressor.

A typical pressure responsive snap acting diaphragm is a thin, internally stressed sheet metal spring disc having a central, dished section. When a sufficiently large pressure differential is applied to the diaphragm in a direction tending to flatten the dished diaphragm section the dished section abruptly moves, or snaps, through the diaphragm center plane to a second position where the central portion is oppositely dished. When the pressure differential is reduced to a sufficiently low level the dished section snap moves back through the center plane to its initial position. The diaphragm motion is typically transmitted mechanically to a switch or a valve.

The high pressure level causing the diaphragm motion can be altered by changing the configuration of the dished diaphragm section. If the dished section is made deeper the pressure differential required to move the diaphragm is increased. If the dished section is flattened a relatively smaller pressure differential causes the diaphragm to respond.

The low pressure level at which the diaphragm returns to its initial position is controlled by limiting the extent of movement of the dished portion beyond the center plane. If the dished portion moves well beyond the center plane a relatively low pressure differential is required to exist before the diaphragm snaps back to its initial position. If the dished portion moves just across the center plane, it snaps back when a relatively larger pressure differential exists.

In order to assure accurate responses to specified high and low pressure levels, pressure control devices are individually calibrated during manufacture. The practice has been to assemble the control devices, subject them to operating pressures and then mechanically deform each assembly in a controlled manner until the diaphragm moves at the applied desired pressure levels.

Typical pressure control devices of the sort referred to have employed a casing defining a chamber communicating with a source of pressure to be controlled, a diaphragm hermetically closing the chamber, a switch fixed with respect to the casing and a motion transfer element between the diaphragm and the switch. The diaphragms have usually been welded about their peripheries directly to the casing or to diaphragm supporting members; but in some instances the diaphragms have simply been sealed in place to the casing with the diaphragm peripheries being unrestrained by weldments.

Some control device constructions have been proposed in which the high and low pressure events can be calibrated during manufacture by use of relatively complicated designs employing adjusting screws, biasing springs, and the like. These proposals resulted in some devices which were too expensive to achieve widespread use particularly for those applications where extremely accurate pressure sensing was not critical. U.S. Pat. No. 4,220,836 discloses an example of a control device constructed to enable high and low pressure level calibration during manufacture.

Simplified designs have also been proposed in which the control devices were built and then subjected to mechanical deformations to achieve calibration. In some proposals the diaphragms and supports were subjected to extreme over-pressure from fluid introduced into the casing. The forces created by the overpressure condition yieldably deformed the diaphragms or their supports to desired configurations.

In other proposals the control devices were constructed so that the diaphragms or their supports could be yielded and bent by mechanical means in order to calibrate the control. These kinds of proposals enabled simplified control device constructions but tended to create poor production yields because the calibration processes were imprecise. In some instances the diaphragms and supports were overstressed and yielded so much that they did not respond to desired pressure levels. In many designs once overstressing occurred the device could not be recalibrated. In other cases the deformation required to adjust the high pressure level resulted in changing the low pressure level to which the device responded and vice versa. When the control devices could not be calibrated the entire device had to be scrapped or rebuilt.

DISCLOSURE OF INVENTION

In accordance with the present invention a new and improved pressure responsive control device is provided wherein a pressure responsive module is constructed, assembled and calibrated prior to its assembly to the control device thus providing an extremely simple control device construction which accurately responds to desired pressure levels and wherein low production yields resulting from calibration problems are substantially obviated.

An important feature of the invention resides in the construction of a pressure responsive module including a snap acting diaphragm, a diaphragm support plate to which the diaphragm is hermetically attached and a base member for connecting the support plate to the pressure device case. The diaphragm support plate includes a supporting region for rigidly maintaining the diaphragm supported along its center plane and a diaphragm control region surrounding the supporting region to which the diaphragm is hermetically joined. The support plate section between the supporting and control regions is yieldably deformed to allow for controllable positioning of the control region relative to the supporting region and enable calibration of the high pressure level to which the control device responds.

The preferred pressure device comprises a second control region surrounded by the supporting region and joined to the supporting region by a yieldably deformed section allowing for controlled positioning of the second control region relative to the supporting region to determine the low pressure level to which the diaphragm responds.

After the diaphragm support has been deformed to control the diaphragm pressure response, the module is hermetically joined to the control device case via the module base member which is so constructed and arranged that the diaphragm and the support plate are isolated from stresses created by connecting the base member to the casing.

In a preferred and illustrated embodiment of the invention the diaphragm supporting plate region is hermetically joined to the base member. The base member rigidly supports the supporting region along the diaphragm center plane. The yieldably deformable plate sections permit displacement of the control regions relative to the supporting region during calibration yet each deformable section substantially isolates the supporting region and the remote control region from deformation during calibration. This enables calibration of the high and low pressure events substantially independently of each other.

Other features and advantages of the invention will become apparent from the following detailed description of a preferred embodiment made with reference to the accompanying drawings.

BEST MODE FOR CARRYING OUT THE INVENTION

Figure 1:
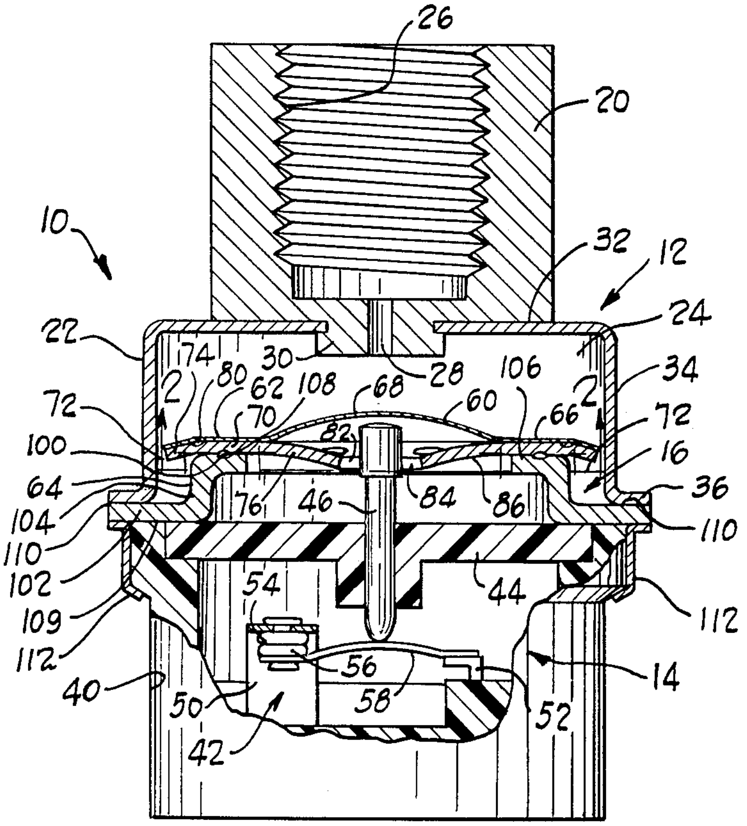
FIG. 1 is an elevational view of a control device embodying the present invention with portions broken away and parts illustrated in cross-section; and, FIG. 2 is a view seen approximately from the plane indicated by the line 2—2 of FIG. 1.
Figure 2:
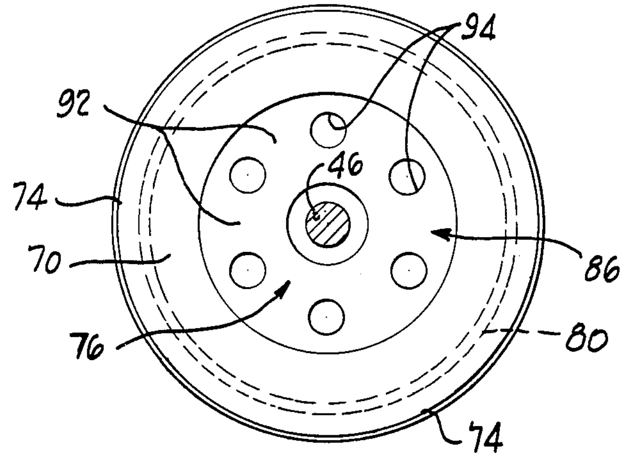

A pressure control device 10 embodying the present invention is illustrated by FIG. 1 of the drawing. The illustrated pressure control device 10 is of the sort which is employed in a refrigertion system, for example, for cycling operation of an electric motor driven refrigerant compressor in response to sensed system refrigerant pressure levels in the condenser. The device 10 communicates with refrigerant in the condenser and when the refrigerant pressure reaches a predetermined relatively high level the control device 10 detects the pressure level and discontinues operation of the compressor. When the sensed refrigerant pressure level reaches a predetermined lower level the control device 10 responds to enable re-initiation of compressor operation.

The control device 10 comprises a pressure housing assembly 12 constructed to communicate with system refrigerant, a control switch assembly 14 electrically connected in a compressor motor controlling circuit, and a pressure responsive module 16 providing a pressure transducer between the housing assembly 12 and the switch assembly 14.

The housing assembly 12 comprises a suitable pressure fitting 20 hermetically attached to a cup-like casing 22 which defines an internal pressure chamber 24. The fitting 12 can be of any suitable or conventional construction and is illustrated as formed by a body having an internal threaded passage 26 terminating in a pressure transmitting port 28 extending through a projection 30 at the end of the body. A refrigerant pressure transmitting metal tube (not illustrated) is threaded into the fitting 20 and sealed in place in order to transmit refrigerant pressure from the refrigertion system to the control device.

The casing 22 is preferably formed by a drawn stainless steel cup having a base 32, a cylindrical wall 34 extending from the base and an outwardly flared mounting flange 36 at the end of the cup wall remote from the base. The base 32 defines an aperture through which the fitting projection 30 extends. The end of the projection 30 is upset and staked in place to the cup base 32. The fitting is brazed to the casing 22 about the projection 30 so that the juncture of the pressure fitting and the casing is hermetic.

The control switch assembly 14 comprises a molded plastic cup-like switch case 40 supporting a switch assembly 42 within it. A plastic cover member 44 extends across the open end of the switch case and defines a central opening through which a switch operating pin 46, formed from a dielectric material, extends. The operating pin 46 transmits switch operating motion between the pressure responsive module 16 and the switch assembly 42.

The switch assembly 42 is formed by terminal bars 50, 52 fixed in the switch case. The terminal bar 50 carries a fixed switch contact 54 while the terminal bar 52 supports a movable switch contact 56 mounted at the projecting end of an electrically conductive cantilevered resilient blade 58.

In the preferred control device the terminals 50, 52 extend through conforming openings in the closed end of the switch case 42 and are staked in place with respect to the case. The terminal bars 50, 52 project from the closed end of the case 42 (not illustrated) and are wired into a circuit for controlling energization of the refrigerant compressor. When the switch contacts are engaged, as illustrated by FIG. 1, the switch assembly 42 is conductive to enable operation of the refrigerant compressor. The switch contacts are opened by deflection of the blade 58 in a direction away from the pressure responsive module 16 so that the compressor controlling circuit is interrupted.

The pressure responsive module 16 hermetically closes the chamber 24 and functions to operate the control switch assembly 42 in response to the detected refrigerant pressure in the chamber. In the illustrated and preferred embodiment the pressure responsive module comprises a diaphragm 60, a diaphragm control plate 62 hermetically connected to the diaphragm and a support member 64 for supporting the control plate and hermetically joining the control plate to the casing 22. Air at or close to atmospheric pressure is present in the switch case 40 so that the module is subjected to differential pressure forces which vary according to changes in the system refrigerant pressure.

The diaphragm 60 is a thin spring metal sheet formed to provide an initially flat annular section 66 disposed about a central dome section 68. The diaphragm is internally stressed such that when no pressure differential exists across the diaphragm the dome section 68 is biased to its position illustrated by FIG. 1 of the drawings. When a pressure differential is applied across the diaphragm in a direction tending to flatten the dome section (viz. when the pressure in the chamber 24 increases above ambient atmospheric pressure) the dome section remains substantially stationary until a predetermined differential pressure level is reached at which time the dome section abruptly moves in snap fashion through the plane of the annular section 66 and assumes a second position in which the curvature of the dome section is reversed. The dome section 68 remains in its second position until the pressure differential across the diaphragm has been reduced to a predetermined lower level at which time the dome section snap moves back to its initial position.

The chamber pressure levels at which the dome section 68 moves are determined by the internal stresses in the diaphragm and these stresses are in turn governed by the configuration of the diaphragm control plate 62. The control plate 62 comprises a supporting region 70 for engaging and supporting the diaphragm 60 along a center plane, generally indicated by the reference character 72, a first diaphragm control region 74 surrounding the supporting region 70, and a second diaphragm control region 76 surrounded by the supporting region 70. After the diaphragm is assembled to the control plate the control plate is subjected to controlled deformations to position the control regions for governing the differential pressure levels at which the diaphragm moves between its positions.

The control region 74 is formed by an annular outer marginal portion of the control plate and is hermetically welded to the diaphragm 60 continuously about its outer periphery. The control region is connected to the supporting region 70 by a deformable weakened plate section 80 to enable controlled movement of the control region 74 relative to the supporting region 70 during calibration without any material deformation or change of position of the supporting region or the control region 76 occurring. In the preferred embodiment the weakened plate section 80 is formed by a circumferential groove, or notch, which surrounds the supporting region.

The control region 74 and the diaphragm section supported thereon project outwardly from the supporting region 70 wholly into the pressure chamber 24. This feature assures that the high pressure chamber fluid completely surrounds the control region 74 and the diaphragm margin so that unbalanced pressure forces can not be exerted on the control region 74. There is thus no tendency for the control region to be yieldably deflected from its calibrated position by high pressure fluid in the chamber 24 during use of the control device 10.

The second diaphragm control region 76 is formed by a dome engaging face 82 surrounding a central plate opening 84. The face 82 engages the dome section 68 about the opening 84 to limit the snap motion of the diaphragm dome section from its first position and thus defines the second position of the dome section. The control region 76 is joined to the supporting region 70 by a weakened yieldably deformable plate section 86. The section 86 allows the second control region to be controllably displaced relative to the supporting region during calibration without significant deformation or change of position of the supporting region or the first control region 74.

In the preferred control device the weakened, deformable section 86 is formed by spokes 92 extending between the supporting region 70 and the face 82. The spokes 92 support the face 82 in cantilever fashion and permit controlled deformation of the section 86 for positioning the face 82. The illustrated spokes are formed by equally spaced holes extending through the plate radially inwardly of the supporting region. The spokes weaken the section 86 sufficiently to enable deformation of the face relative to the supporting region during calibration of the device but are sufficiently strong to resist deformation as a result of operating pressure forces experienced during use of the control device.

If increased deformability of the weakened section 86 is desired a shallow circumferential groove or notch can be formed in the control plate along the juncture of the supporting region 70 and the control region 76.

The weakened plate sections 80, 86 are illustrated by FIG. 1 as substantially deformed so that the respective associated control regions 74, 76 are moved well away from the plane 72. The degree of deformation is somewhat exaggerated for purposes of illustration.

The supporting region 70 rigidly supports a major portion of the diaphragm section 66 in full face contact along the center plane 72. The pressure differential between the chamber 24 and the atmosphere ambient the control maintains the diaphragm engaged across the face of the supporting region 70 during normal operation of the control device so that the diaphragm position remains stabilized.

The base member 64 is preferably formed by a sheet metal cup-like body hermetically joined to the control plate 62 and constructed and arranged for hermetic attachment to the casing 22 when the control device 10 is assembled. The base member 64 comprises a first body portion 100 hermetically attached to and rigidly supporting the plate region 70, a second body portion 102 constructed for attachment to the casing 22 and an imperforate generally cylindrical wall 104 interconnecting the portions 100, 102.

The body portion 100 is preferably formed by an annular flange projecting radially inwardly from the body wall 104. The flange defines a face 106 confronting the supporting region 70 for engaging and supporting the region 70. In the preferred embodiment the face 106 corresponds in size and shape to the supporting region 70 so that the supporting region 70 is fully supported by the face 106. The face 106 and the supporting region 70 are joined by a hermetic weld which extends continuously circumferentially about the center of the region 70. The weld joint 108 is preferably formed by a resistance weld, but could be formed by other suitable welding techniques.

The body portion 102 defines a mounting flange projecting radially outwardly from the wall 104 to provide a flat rigid locating face 109 for the switch assembly and an outer peripheral margin 110 confronting and engaging the casing flange 36. The flange 36 and marginal portion 110 of the body 102 are hermetically joined by a continous circumferential weld which is preferably a plasma weld. The weld joint between the flange 36 and the marginal portion 110 must provide a high degree of burst strength because it is subjected to refrigerant pressure in the chamber 24. Accordingly, a relatively large, high strength weld joint must be formed between these parts.

In the illustrated embodiment a switch mounting ring 112 is welded to the flange margin 110 and clinched to the switch casing to complete the control device assembly. The juncture between the switch assembly and the module 16 is not hermetically sealed and accordingly the interior of the control device 10, except for the chamber 24, is initially exposed to ambient atmospheric pressure. The preferred control devices are frequently potted, i.e., the switch casing and related parts are covered by a suitable compound which serves to seal the interior of the control from the surroundings. The atmospheric air in the device is trapped by the potting material and thus the interior of the control switch casing remains at or about atmospheric pressure under most conditions of use of the device.

An important aspect of the invention resides in the construction of the module 16 which enables the module to be calibrated prior to its assembly to the casing 22. The module 16 is initially fabricated by welding the diaphragm to the control plate and welding the control plate to the support body. The supporting region 70 and the control region 74 are preferably flat and coplanar at this juncture while the control region 76 is initially deformed out of the plane of the supporting region 70 in the direction away from the diaphragm.

The assembled module is then placed in a calibration pressure chamber with the body flange 102 sealing the chamber from ambient atmospheric pressure to enable controlled pressure differentials to be established across the diaphragm. The chamber pressure is raised to a high pressure level at which the diaphragm snap moves into engagement with the face 82. This pressure level is compared to the desired calibration pressure level at which the switch contacts should be opened and the chamber pressure is relieved.

A forming die is urged into contact with the diaphragm and the control region 74 to yield and deform the weakened control plate section 80 and reposition the control region 74 relative to the supporting region 70. The control plate is slowly yieldably deformed so that the control region 74 assumes a slightly conical configuration. This, in turn, alters the diaphragm stresses to reduce the internal spring biasing forces tending to resist diaphragm motion. The calibration chamber is pressurized again to determine the new pressure level at which the diaphragm snap moves against the face 82. If the diaphragm moves at a pressure level above the desired calibration pressure level the deformation step is repeated to further deform the control region 74. This process is repeated until the device responds at the desired calibration pressure level.

In order to calibrate the low pressure operating level, the calibration chamber pressure is reduced until the diaphragm snap moves away from the face 82. This level is compared to the desired calibration pressure level at which the diaphragm should move away from the face 82. If the pressure level is too low, as it should be, a second forming die is moved into engagement with the control region 76 to yieldably deform the plate section 86 in the direction of the diaphragm.

The chamber pressure is next increased to reengage the diaphragm with the face 82 and reduced until the diaphragm snap moves away from the face 82 again. The pressurization - deformation steps are repeated as necessary until the control region 76 has been moved relative to the supporting region to the extent that the dome section snaps away from the face 82 at the desired low calibration pressure level.

The chamber pressure is next cycled between the high and low calibration pressure levels to check the calibration. If the diaphragm fails to respond at a desired calibration pressure level the diaphragm control plate can be "bumped" again by either or both of the forming dies to reposition the control regions so that the diaphragm responds to the calibration pressure levels.

If the low pressure level at which the diaphragm responds is higher than the desired pressure level, the module 16 can be subjected to a sufficient over-pressure in the calibration chamber to force the diaphragm into engagement with the control region 76 and deform the control region away from the center plane 72. This deformation reduces the low pressure level to which the diaphragm responds.

The weakened diaphragm control plate sections serve to isolate the supporting region 70 from deformation of the control regions 74, 76. This is particularly important because deforming either control region could otherwise be accompanied by twisting or dishing of both the supporting region and the other control region.

After calibration is completed the module 16 is removed from the calibration chamber and retained in inventory until required for production. At that time the fully assembled, calibrated pressure responsive module 16 is welded to the casing flange 36 by a circumferential, hermetic weld joint.

Because the weld joint must be quite strong, the weld is relatively large and a significant amount of heat is required to produce it. It is necessary to shield the diaphragm and the support plate from excessive heating after calibration while welding the module to the pressure casing flange because differential expansion and contraction of the diaphragm and support plate can adversely affect the calibration. Accordingly the support member 64 is constructed from a relatively light gage stainless steel stamping which has a relatively low coefficient of conductive heat transfer and thus strongly resists heat conduction from the welding area to the diaphragm plate. Further, the support member mounting flange and the cylindrical wall 104 serve to provide a relatively long heat flow path between the weld joint and the diaphragm support which further inhibits heating of the diaphragm and the support plate.

While a preferred embodiment of the invention has been illustrated and described in detail, the present invention is not to be considered limited to the precise construction disclosed. For example, although a single diaphragm disc is disclosed the diaphragm could be constructed using multiple nested snap discs. Various adaptations, modifications and uses of the invention may occur to those skilled in the art to which the invention relates and the intention is to cover all such adaptations, modifications and uses falling within the spirit or scope of the appended claims.

We claim:

1. A calibrated pressure responsive module constructed for hermetic connection to a pressure control device casing, the module comprising a diaphragm supported along a diaphragm center plane, a diaphragm control plate supporting said diaphragm, and a base member for connecting said plate and diaphragm to said control device casing, the pressure responsive module characterized in that:

(a) the diaphragm includes an outer marginal section hermetically joined to said plate and a central dome section snap movable from a first position on one side of said center plane to a second position on the opposite side of said center plane in response to application of a first predetermined differential pressure force to said diaphragm and snap movable from said second position to said first position in response to application of a second predetermined differential pressure force to said diaphragm;

(b) the diaphragm control plate comprises:

(i) a supporting region rigidly supporting a portion of said diaphragm surrounding said dome section along said center plane;

(ii) a first diaphragm control region hermetically bonded to said diaphragm marginal section and surrounding said supporting region, said control plate yielded and deformed between said supporting region and said control region to yieldably shift said control region relative to said supporting region and stress said diaphragm so that said dome section moves from said first position at said first predetermined pressure;

(iii) a second diaphragm control region surrounded by said supporting region and defining a diaphragm engaging face for engaging said diaphragm dome section in said second position, said control plate yieldably deformed between said supporting region and said second control region with said second control region yieldably shifted relative to said supporting region to position said dome engaging face for enabling said dome section to snap from said second position at said second predetermined differential pressure; and (c) said base member comprises a first body portion hermetically bonded to said supporting region for rigidly positioning said supporting region with respect to said diaphragm center plane, a second body portion remote from said first body portion constructed for hermetic attachment to said control device casing, and an imperforate body wall between said first and second body portions.

2. The pressure responsive module claimed in claim 1 wherein said diaphragm marginal section and said first control region project outwardly from said supporting region and said first body portion so that said diaphragm marginal section and said first control region are exposed to balancing fluid pressure on opposite sides.

3. The pressure responsive module claimed in claim 1 further including a weakened yieldably deformable plate section between said supporting region and said first control region, said weakened section yieldably deformable to enable yielding shifting motion of said first control region while said supporting region remains rigidly supported by said base member and isolated from the shifting of said control region.

4. The pressure responsive module claimed in claim 3 wherein said plate comprises a second yieldably deformable plate section between said supporting region and said second control region, said second deformable section isolating said supporting region from shifting movement of said second control region.

5. A pressure responsive module comprising a diaphragm, a diaphragm control plate supporting said diaphragm and a body member for connecting said module to a pressure control device and wherein:

(a) said diaphragm comprises an outer peripheral section hermetically attached to said control plate and a central dome section snap movable between oppositely dished configurations on opposite sides of a diaphragm center plane in response to differential pressures applied to said diaphragm;

(b) said control plate comprising:

(i) a rigid supporting region for engaging and fixedly locating said diaphragm with respect to said center plane, said supporting region hermetically, rigidly fixed to said body member;

(ii) a first diaphragm control region surrounding said supporting region and to which said diaphragm is hermetically fixed;

(iii) a weakened plate section between said supporting region and said first diaphragm control region, said weakened plate section yieldably deformed to position said first control region relative to said center plane for stressing said diaphragm dome section to respond to a predetermined pressure differential;

(iv) a second diaphragm control region surrounded by said supporting region, said second control region positioned for contacting and positioning said diaphragm dome section with respect to said center plane for stressing said dished section to respond to a second predetermined pressure differential applied to said diaphragm;

(v) a second weakened section between said supporting region and said second diaphragm control region, said second weakened section yieldably deformed to position said second control region with respect to said center plane;

(vi) said body member defining a support face coextending with and rigidly supporting said supporting region against deflection with respect to said center plane when said first and second weakened sections are deformed and a remote mounting structure constructed for hermetic attachment to a control device casing.

6. The module claimed in claim 5 wherein said supporting region defines a planar annulus having a first surface for supporting an annular section of said diaphragm surrounding said dome section and a second surface in face contact with said body member support face, said body member support face and said second supporting region surface joined by a circumferentially continuous hermetic weld.

7. The module claimed in claim 5 wherein said body member in constructed from relatively light gage sheet metal material having a relatively low coefficient of conductive heat transfer, said remote mounting structure adapted for welding to the casing.

8. A pressure responsive control device comprising:

(a) pressure housing assembly defining a pressure chamber;

(b) actuatable control means fixed to said housing assembly; and, (c) a preassembled pressure transducer module or unit hermetically closing the pressure chamber and comprising a snap acting pressure responsive diaphragm, a diaphragm control plate hermetically bonded to the diaphragm outer periphery, said control plate having a supporting region rigidly supporting said diaphragm and a diaphragm control region yielded and deformed relative to said supporting region to position said control region for stressing said diaphragm and determining the chamber pressure level at which said diaphragm moves, and a support member hermetically bonded to and supporting said supporting region and hermetically joined to said housing assembly remote from said supporting region.

9. The control device claimed in claim 8 further including a second diaphragm control plate region surrounded by said supporting region, said plate including a deformable weakened section between said second control region and said supporting region, said deformable weakened section yielded to enable positioning of said second control region relative to said supporting region for determining the degree of motion of said diaphragm.

10. The control device claimed in claim 8 wherein said control region and the diaphragm portion supported thereby extend into said pressure chamber to assure the application of balancing pressure forces thereon on opposite sides during operation of the control.

11. A pressure control device comprising:

(a) a casing defining a pressure chamber; and, (b) a precalibrated pressure responsive module hermetically closing said chamber comprising:

(i) a pressure responsive diaphragm defining a central dome section and a surrounding marginal section; and (ii) diaphragm support plate comprising an annular planar supporting region rigidly supporting a portion of said diaphragm marginal section along a diaphragm center plane and a diaphragm control region surrounding said supporting region and hermetically joined to said diaphragm circumferentially about said supporting region, said diaphragm control region projecting from said supporting region into said chamber with the plate section between said supporting region and said control region deformed to position said control region relative to said supporting region to produce a predetermined stress condition in said diaphragm.

12. The control device claimed in claim 11 wherein said module further comprises a base member hermetically joined to and rigidly supporting said supporting region, said base member defining a casing engaging face remote from said supporting region, said casing engaging face hermetically joined to said casing.

* * * * *